United States Patent

[11] 3,572,931

| [72] | Inventor | Hans Adler<br>New York, N.Y. |
|---|---|---|
| [21] | Appl. No. | 639,872 |
| [22] | Filed | May 19, 1967 |
| [45] | Patented | Mar. 30, 1971 |
| [73] | Assignees | Florence Wexler;<br>Hans Adler<br>New York, N.Y. |

[54] SURFACE COMPARATOR
12 Claims, 6 Drawing Figs.

[52] U.S. Cl............................................................ 356/46,
356/173, 356/178, 356/179, 356/186, 356/195,
351/47, 351/59
[51] Int. Cl........................................................ G01j 5/52,
G01j 3/46, G01j 3/48
[50] Field of Search............................................ 356/46, 48,
49, 72, 186, 188, 189, 190, 195, 178, 173;
350/145, 146, 311, 315, 319; 351/49; 351/47;
240/1.1; 356/179

[56] References Cited
UNITED STATES PATENTS

| 2,628,530 | 2/1953 | Rabben....................... | 350/146X |
| 2,789,462 | 4/1957 | Forgrave..................... | 351/49 |
| 3,203,310 | 8/1965 | Smith et al.................. | 356/189 |
| 2,935,910 | 5/1960 | Schmidt....................... | 356/146 |
| 3,355,982 | 12/1967 | Rendina........................ | 356/186 |
| 3,414,347 | 12/1968 | Stoltze......................... | 350/145 |
| 2,844,987 | 7/1958 | Parker......................... | 350/315 |
| 2,907,041 | 10/1959 | Finn.............................. | 350/315X |
| 3,016,543 | 1/1962 | Lindblom.................... | 351/47X |
| 3,147,489 | 9/1964 | Nelson........................ | 351/47X |
| 3,183,523 | 5/1965 | Harrison..................... | 2/13 |
| 3,188,218 | 6/1965 | Elmer et al................. | 240/1.1X |

*Primary Examiner*—Ronald L. Wibert
*Assistant Examiner*—Paul K. Godwin
*Attorney*—Stoll and Stoll ABSTRACT: For purposes of color and surface structure visual comparison, the placement of a color temperature changing light filter in the optical path of light reflected from an object or objects to an observer.

Patented March 30, 1971
3,572,931
2 Sheets-Sheet 1
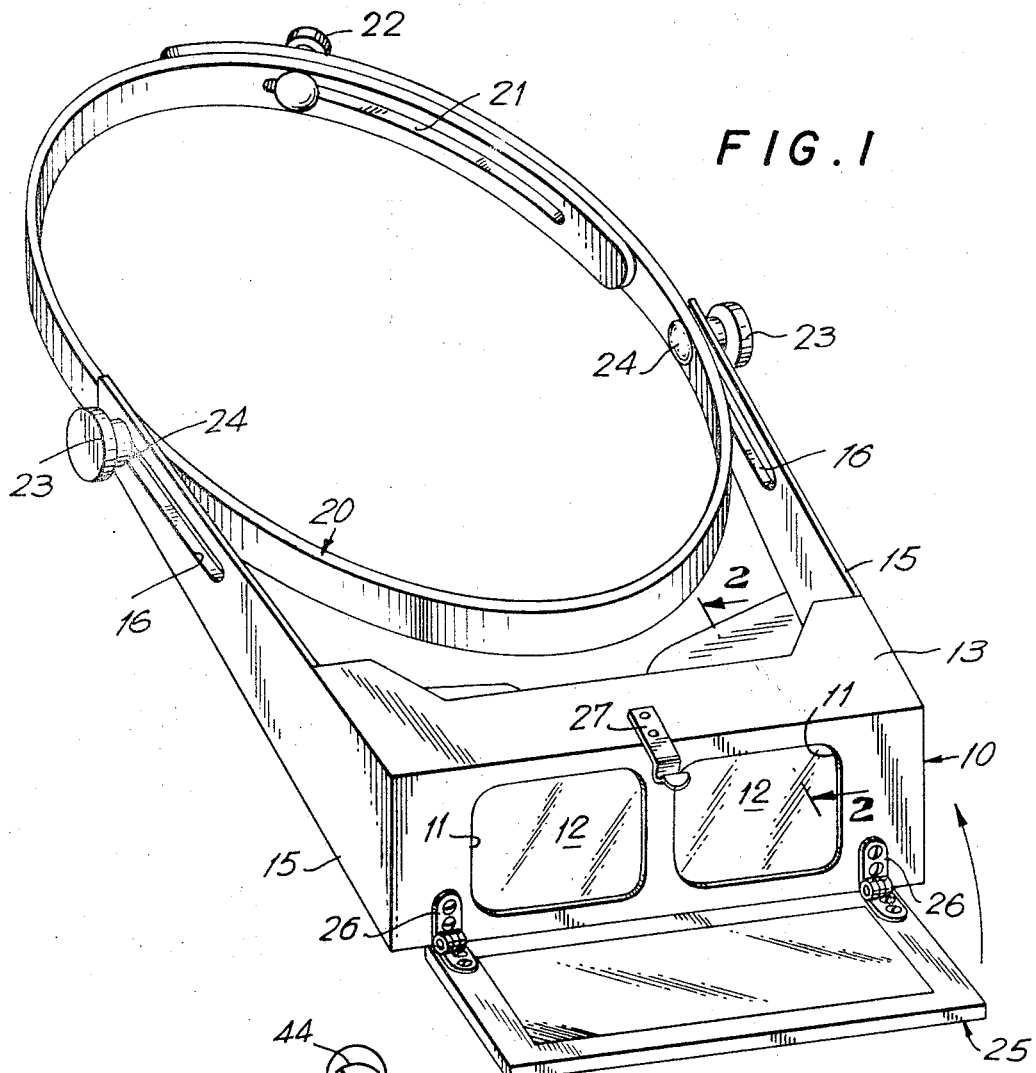
FIG.1
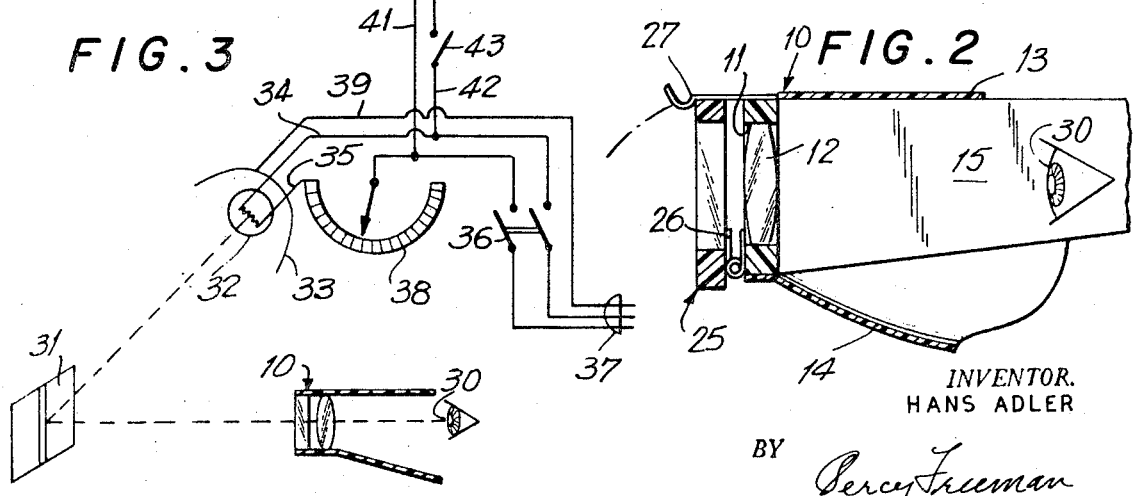
FIG.3
FIG.2
INVENTOR.
HANS ADLER
BY Percy Freeman
ATTORNEY

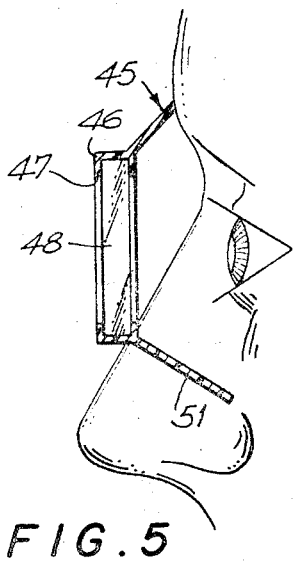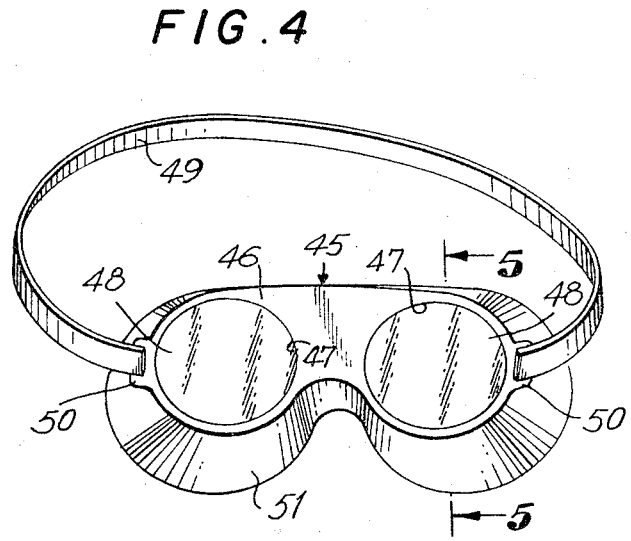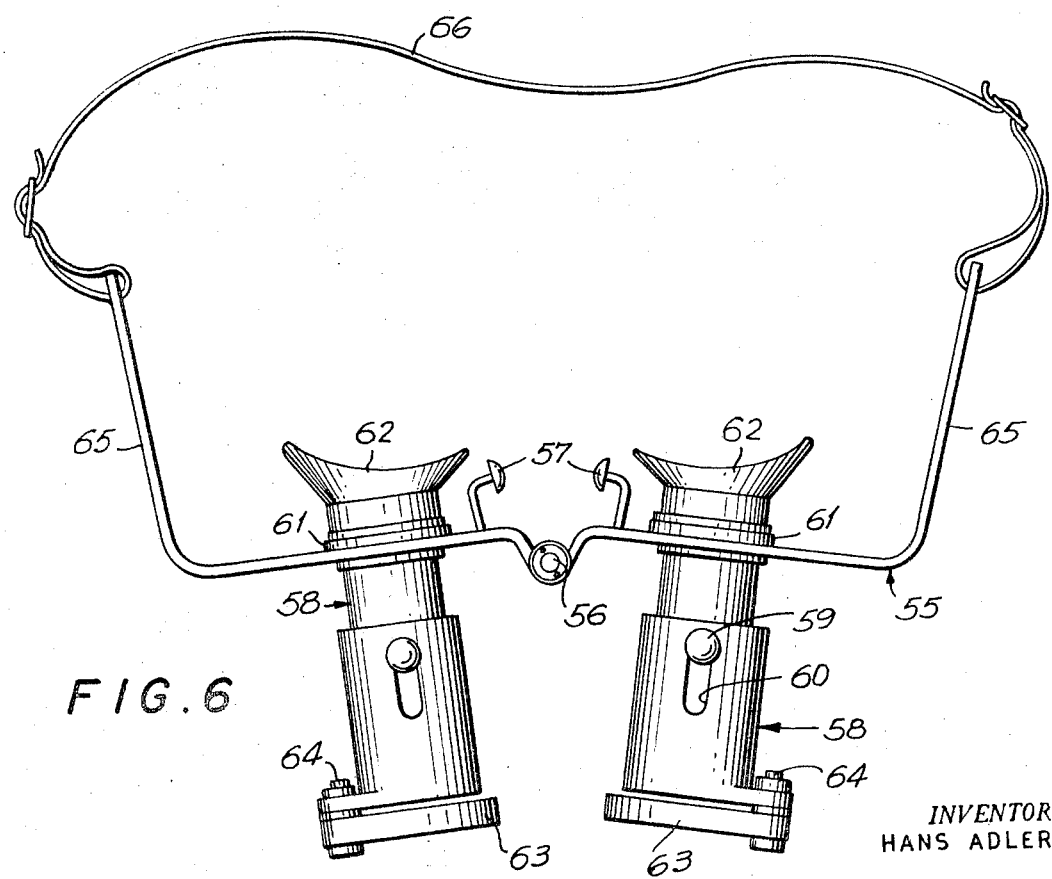
INVENTOR.
HANS ADLER

SURFACE COMPARATOR

BACKGROUND OF THE INVENTION

Instruments of various kinds for color and surface evaluation are known, and are extensively used in many industries.

Also, without use of instruments, colored products are inspected and compared visually under a variety of light sources. For many purposes, evaluation under daylight and incandescent lamps is adequate. Natural daylight, long the favorite, has been replaced by artificial daylight of specified intensity and spectral composition.

As instruments, we mention here color comparators, colorimeters, spectrophotometers and their combinations with evaluating systems. These instruments usually consist of optical systems with or without electronic systems and light sources enclosed in an instrument housing.

As artificial light sources for routine visual inspection and evaluation, without use of comparing instruments, we mention here the various kinds of electrical lamps used for illumination of objects in special rooms or in shielding cabinets. Such lamps serve to produce incandescent light and/or artificial daylight favorable for the human eye to differentiate and evaluate colors. The specifications for such standard light sources have been developed by the International Commission on Illumination (CIE).

To make available incandescent light, as well as artificial daylight, frequently gas filled incandescent lamps are used combined with color temperature changing daylight filters. In such applications, the daylight filter is placed in front of the lamp so that the object is illuminated by the artificial daylight. Also, incandescent and fluorescent lamps have been developed to yield artificial daylight under which the visual color evaluation is carried out. Artificial daylight conditions have also been produced by combinations of special fluorescent and incandescent lamps.

Summarizing the above described means used for visual evaluation of colors of objects we find that, essentially, two methods are used:

The first method is represented by closed instruments with oculars, light sources, and apertures for contact with colored objects.

The second method is represented by the visual evaluation of object colors under a suitable variety of light without instrument. The suitable light conditions are produced artificially.

SUMMARY

This invention relates to the visual color and surface structure comparison of objects in many fields such as textiles, metals, plastics, dyes, paints, ceramics, teeth, gums, skin, hair, cosmetics, tea, foods, powdered materials, paper and others.

More specifically, the invention comprises optical devices for viewing surfaces of objects to be evaluated under suitable light sources, and consists of daylight filters combined with eyeglasses or binocular magnifiers for stereoscopic viewing of the objects at a desirable working distance of approximately 10 inches, leaving the hands of the operator free for manipulation of the objects.

The main purpose of the invention is the checking and matching of colors and surfaces of products, under a variety of light sources, for reproduction of same and/or meeting required standards.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

BRIEF DESCRIPTION OF THE DRAWING

FIG. 1 is a top perspective view showing apparatus constructed in accordance with the teachings of the present invention.

FIG. 2 is a transverse sectional view taken generally along the line 2-2 of FIG. 1.

FIG. 3 is a schematic diagram showing apparatus of the present invention in use.

FIG. 4 is a front perspective view showing a modified embodiment of the present invention.

FIG. 5 is a sectional view taken generally along the line 5-5 of FIG. 4, with the apparatus in use on a wearer's face.

FIG. 6 is a top plan view showing a further embodiment of the present invention.

DESCRIPTION OF THE PREFERRED EMBODIMENTS

In the present invention, the objects are illuminated by standard incandescent lamps without color temperature changing filters, whereas such filters are positioned in the light path connecting the eyes of the observer with the objects which are to be viewed and evaluated. As will be seen in the subsequent descriptions of preferred forms of the invention, this method has very important advantages over the previously used methods.

The preferred form described here is shown in FIGS. 1 and 2 of attached drawings and consists of a binocular magnifier which is worn by the user in front of his eyes by means of a head band and a swing-away color temperature changing filter. This filter is made of suitable glass and is attached, preferably, in front of the magnifying lenses of the binocular frame.

The color temperature changing filter is a so-called daylight filter capable of changing the continuous visible light spectrum produced by standard incandescent gas filled tungsten lamps into a continuous visible light spectrum typical for daylight. The device is also equipped with some shielding against undesirable side lights.

The instrument thus fulfills, in a very simple manner, its purpose of evaluating colors under daylight and incandescent light because it makes it possible to evaluate colors under artificial daylight and, by swinging the daylight filter away, also under incandescent light.

For the visual evaluation of colors under artificial daylight, the third method suggested above (that of illuminating the object by incandescent light and viewing the object through daylight filters) is of absolute equivalence to the second method of illuminating the object by daylight (through the daylight filters placed in front of the incandescent lamps) and viewing the object directly.

In both methods, the spectral composition of the light reaching the eyes of the observer after reflection from the object is identical.

As a light source to illuminate the objects, gas filled tungsten lamps can be used. The color temperature of such lamps from 40 Watts up complies within acceptable tolerances to CIE Standard Source A, the representative of incandescent light. According to the present invention, the use of this same lamp with daylight filters attached to the binocular magnifier will achieve a correlated color temperature of CIE Standard Source C representative of average daylight.

In this connection, it is, of course, also practical to use tungsten lamps with a variable color temperature by regulating the electric voltage. FIG. 3 of attached drawings shows a schematic diagram of such an arrangement. For example, by using a tungsten projector lamp with a color temperature of 3000° K. at 120 volts (standard line voltage), the voltage can be stepped down to obtain lower color temperatures such as standard source A and lower. This changing of the color temperature of the tungsten lamp when combined with the kind of daylight filter attached to the binocular magnifier will yield a variety of very favorable artificial daylight such as north-light, average daylight, and noon-sunlight.

It is, of course, necessary to provide an illumination of sufficient intensity and to prevent illumination of the objects from any light sources other than clear gas filled tungsten lamps.

The simplest device using the above-described principles is a pair of daylight filter goggles, as shown in FIGS. 4 and 5 of the drawings. The objects would appear to the observer, in natural size and in perfect artificial daylight, in the object is illuminated by a strong enough tungsten lamp with a color temperature between 2700° K. and 3000° K.

It is possible to build prescription lenses into the goggles for persons with faulty sight, or to fit the goggles with prescription lenses made out of daylight filter glass. In the latter case, the thickness of the lens is within the thickness range specified by the maker of the daylight filter glass.

Another form of the invention is shown in FIG. 6 of the drawings. This is a pair of telesight binocular magnifiers, mounted on a frame, to be worn by the observer with an elastic headband or by other suitable means. In front of each magnifier, a swing-away daylight filter is attached. The telescopic magnifiers are individually adjustable to fit each eye with a wide range for normal and nonnormal eyesights. This feature also permits adjustment of the working distance between observer and object. The center lines of the two magnifiers are at an adjustable angle with each other to meet at the object for a stereoscopic view of the object. Also provided, is an interpupillary adjustment.

Referring more specifically to the embodiment of FIGS. 1 and 2, a binocular frame is there generally designated 10 and formed with a pair of laterally spaced windows 11, each of which is provided therein with a magnifying lens 12 extending across the respective window. Extending from the frame 10, respectively from the upper and lower edges thereof, are upper and lower light shields 13 and 14, while a pair of brackets 15 extend rearwardly from opposite sides of the frame 10, being provided at their distal ends with longitudinally extending slots 16. An adjustable headband 20 is interposed between the brackets 15, having suitable adjustment means, such as slots 21 and locking nut 22. Also, there may be provided locking nuts 23 carried by studs 24 extending from opposite sides of the headband 20 through respective slots 16.

On the front side of the frame 10 may be provided a color temperature changing daylight glass filter 25, mounted for swinging movement into and out of position extending across the windows 11, as by hinges 26. In the position illustrated, the filter 25 is swung downwardly, out of its operative position across the windows 11, while in FIG. 2 the filter 25 is swung upwardly, into operative position across the windows, and releasably retained therein by a resilient snap strip 27 carried by the top shield 13 of the frame 10.

It will now be appreciated, that the headband 20 may be circumposed about the user's head, and the frame 10 adjusted forwardly and rearwardly to a selected position toward and away from the user's eyes, the windows 11 being in front of or in the line of sight of respective eyes.

The overall operation is diagrammatically represented in FIG. 3, the binocular frame there being designated 10, in position in front of the user's eye 30, for viewing objects 31. A tungsten lamp 32 is provided with a reflector 33, the lamp and reflector being arranged to illuminate the objects 31 for viewing.

Terminals of the lamp 32 are respectively connected to conductors 34 and 35, which are connected through a switch 36 by suitable plug means 37 to a source of electric supply. Connected in the conductor 35 is a voltage regulator 38, and a ground line 29 may be connected to the reflector 33. Also, a voltmeter 40 may be connected by conductors 41 and 42 across the supply lines 34 and 35, a switch 43 being connected in one of the conductors 41 and 42. Advantageously, the voltmeter 40 may have its scale 44 calibrated to indicate color temperature.

In the embodiment of FIGS. 4 and 5, there is shown a viewer 45 including a binocular frame 46 having a pair of laterally spaced windows 47. The windows 47 are each provided with a color temperature changing glass filter 48, extending across the respective window. A strap 49 or other suitable headband may be carried by the frame 46, say having opposite ends connected to opposite sides of the frame at loops or eyes 50. Also, a specifically configured arrangement of light shielding 51 may be carried on the inner side of the binocular frame 46 for conforming engagement with a wearer's face, as seen in FIG. 5, the light shield 51 advantageously being fabricated of resiliently flexible material, such as rubber or the like.

Referring now to the embodiment of FIG. 6, a binocular frame is there generally designate 55 and may be of sectional construction articulated at its medial range by a hinge or pivot 56, each section carrying a nosepad 57. The articulated frame 55, is provided with a pair of laterally spaced windows, each being provided with a telescopic or telesight magnifier 58, each having a suitable focusing-adjustment means, as by a pin 59 and slot 60. The magnifiers 58 each extend through a respective window of the frame 55, being locked or secured in position therethrough, as by a locking nut 61, which locking nuts may also serve to secure the magnifiers 58 at a desired interpupillary distance. The inner end of each telescopic magnifier 58 may be provided with a light shield, as at 62 for conforming engagement with the face of a user to exclude undesired illumination from the user's eyes.

At the forward end of each telescopic magnifier 58 may be located a daylight filter glass 63, respectively carried by pivots 64, to mount the filter means for selective swinging movement into and out of the user's line of sight.

Opposite sides of the binocular frame 55 may be provided with rearward extensions of temples 65, and a head strap 66 may be connected between the ends of the temples 65 for securing the assembly in position on a wearer's head.

From the foregoing, it will now be understood that the instant invention affords a color and surface structure comparator having stereoscopic or three-dimensional direct viewing of the objects, wherein the comparator is extremely simple in construction and thus inexpensive to manufacture and durable and reliable throughout a long useful life. In addition, the user can observe in all directions and at all angles, requiring only that the objects be sufficiently illuminated, and that any incandescent lamps may be used, with the objects at a perfect working distance for the particular operator. Also, the operator may have both hands free for use, while the objects may be observed under magnification, if desired. It will also be apparent that the instrumentalities of the present invention are relatively simple and compact, capable of being carried in one's pocket, as well as being optically adjustable to variations of different persons' eyesight, and capable of use with or without conventional glasses.

Although the present invention has been described in some detail by way of illustration and example for purposes of clarity of understanding, it is understood that certain changes and modifications may be made within the spirit of the invention and scope of the appended claims.

I claim:

1. A color and surface structure comparator for use on objects illuminated by incandescent light, comprising a binocular frame to be worn on the face of a user, said frame having a pair of windows for viewing therethrough by the user, shielding means on said frame to permit the passage of light to the user's eyes only through said windows, color temperature changing filter means carried by said frame for viewing therethrough, object-magnifying lens means in said windows, and means mounting said color temperature changing filter means on said frame for movement into and out of location across said windows.

2. A color and surface structure comparator according to claim 1, in combination with means mounting said magnifying lenses for selective adjustment toward and away from the wearer's eyes to achieve variable long working distances.

3. A color and surface structure comparator according to claim 1, in combination with binocular telesight magnifiers carried by said frame associated with respective windows.

4. A color and surface structure comparator according to claim 1, said filter means effecting change of the spectral composition of standard incandescent lamplight to the spectral composition of standard daylight.

5. A color and surface structure comparator comprising an incandescent tungsten lamp for illuminating objects to be compared, a binocular frame to be worn on the face of a user, said frame having a pair of windows for viewing therethrough said objects, shielding means on said frame to permit the passage of light to the user's eyes only through said windows, color temperature changing filter means carried by said frame for viewing therethrough, and a voltage regulator connected to said lamp to modify the color temperature thereof.

6. A color and surface structure comparator according to claim 5, wherein said tungsten lamp produces a color temperature of approximately 3000° K. at line voltage, and by adjustment of voltage, light of a lower color temperature of for instance 2854° K. representing standard source A incandescent lamp and by further adjustment of voltage other desirable color temperatures.

7. A color and surface structure comparator according to claim 6, wherein said color temperature changing filter means provides daylight color temperatures including 6,770° K. representing standard source C correlated to 2,854° K; within admissible tolerances.

8. A color and surface structure comparator according to claim 5, in combination with a voltmeter in circuit with said lamp.

9. A color and surface structure comparator according to claim 8, in combination with a scale on said voltmeter calibrated for color temperatures.

10. A color and surface structure comparator comprising color temperature changing filter means, said color temperature changing filter means being selectively positioned in the optical path of light reflected from the object or objects observed to the observer for filtered-light comparison of the object or objects and being manually retracted therefrom for unfiltered-light handling of the object of objects, shielding means for preventing the admission of extraneous light and magnifying lens means, said magnifying lens means being selectively positioned in said optical path.

11. A comparator in accordance with claim 1, wherein:
said object magnifying lens means being selectively positioned in the optical path of light reflected, from the object or objects observed, to the observer.

12. A color and surface structure binocular comparator provided with an adjustable headband for mounting on the user's head and including a main frame and a lens plate provided with a front wall and color temperature changing lenses mounted therein and pivotable on the main frame for rotatable movement from its functional position in the line of sight into a removed position outside the line of sight, providing a change form light-modified position to unmodified light position.